(12) United States Patent
Uhrich

(10) Patent No.: US 9,762,943 B2
(45) Date of Patent: Sep. 12, 2017

(54) TECHNIQUES FOR GENERATING AND PROVIDING PERSONALIZED DYNAMIC LIVE CONTENT FEEDS

(71) Applicant: Telefonaktiebolaget L M Ericsson (publ), Stockholm (SE)

(72) Inventor: Ryan Uhrich, Vancouver, WA (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 14/942,858

(22) Filed: Nov. 16, 2015

(65) Prior Publication Data

US 2017/0142462 A1 May 18, 2017

(51) Int. Cl.
| | |
|---|---|
| H04N 7/10 | (2006.01) |
| H04N 7/025 | (2006.01) |
| H04N 5/445 | (2011.01) |
| G06F 3/00 | (2006.01) |
| G06F 13/00 | (2006.01) |
| H04N 21/2668 | (2011.01) |
| H04N 21/2187 | (2011.01) |
| H04N 21/258 | (2011.01) |
| H04N 21/45 | (2011.01) |
| H04N 21/466 | (2011.01) |
| H04N 21/472 | (2011.01) |
| H04N 21/235 | (2011.01) |
| H04N 21/84 | (2011.01) |

(52) U.S. Cl.
CPC ..... *H04N 21/2668* (2013.01); *H04N 21/2187* (2013.01); *H04N 21/2353* (2013.01); *H04N 21/25891* (2013.01); *H04N 21/4532* (2013.01); *H04N 21/4667* (2013.01); *H04N 21/4668* (2013.01); *H04N 21/47202* (2013.01); *H04N 21/84* (2013.01)

(58) Field of Classification Search
CPC .......... H04N 21/4755; G06F 17/30843; H04L 29/08936
USPC ....... 725/13, 14, 38, 39, 44, 45, 46, 47, 100
See application file for complete search history.

(56) References Cited

U.S. PATENT DOCUMENTS

| | | | |
|---|---|---|---|
| 2003/0020744 A1* | 1/2003 | Ellis | H04H 60/31 715/723 |
| 2004/0001081 A1 | 1/2004 | Marsh | |
| 2009/0083141 A1 | 3/2009 | Craine | |
| 2012/0291079 A1 | 11/2012 | Gordon et al. | |
| 2013/0081085 A1 | 3/2013 | Skelton et al. | |

(Continued)

FOREIGN PATENT DOCUMENTS

WO 0004708 A1 1/2000

*Primary Examiner* — Nnenna Ekpo
(74) *Attorney, Agent, or Firm* — Nicholson De Vos Webster & Elliott, LLP

(57) ABSTRACT

Exemplary methods for generating and providing personalized dynamic live content feeds are described. Recommended live content can be dynamically and intelligently provided to users based upon their prior consumption history so that the recommendations are highly relevant to the user. Live content recommendations can be provided to the user using feeds only when content exists that the user is likely to be interested in. These feeds can be displayed only when a minimum number of a specific live content items of a particular type or category are currently airing, and can be removed from the user interface when the content finishes airing and/or the minimum number of items is no longer met.

17 Claims, 8 Drawing Sheets

(56) References Cited

U.S. PATENT DOCUMENTS

| | | |
|---|---|---|
| 2013/0326354 A1 | 12/2013 | Anderson |
| 2014/0344861 A1 | 11/2014 | Berner et al. |
| 2015/0195621 A1* | 7/2015 | Harron ............... H04N 21/4668 |
| | | 725/46 |
| 2016/0080794 A1* | 3/2016 | Raman ............... H04N 21/2668 |
| | | 725/28 |

* cited by examiner

TECHNIQUES FOR GENERATING AND PROVIDING PERSONALIZED DYNAMIC LIVE CONTENT FEEDS

FIELD

Embodiments of the invention relate to the field of computing systems, and more specifically, to techniques for generating and providing personalized dynamic live content feeds.

BACKGROUND

"Television as a service" provides value to both operators and end users alike. For the end users, it provides entertainment value and for operators, it provides a platform to advertise shows, movies, etc., to those end users. With the advent of the modern, on-demand lifestyle largely enabled by the widespread adoption of the Internet and its penetration into the everyday lives of many people, being able to provide users with personalized content has become key.

There are many ways to promote and personalize content to people. One example used in some environments, and particularly in television as a service, includes using hand-curated lists of recommended content. Another common, more automated solution includes using statistical techniques such as machine learning to generate content recommendations for users based on, for example, the user's indicated or deduced preferences and/or past consumption history.

Within the realm of providing audiovisual content, video-on-demand and live television are two predominant forms. With video-on-demand (or "VOD"), it is relatively easy to curate a list of recommendations or generate personalized recommendations automatically. For example, once there is data gathered on a given user, anything in the VOD store is available to be advertised. The larger the VOD store, the more likely a user will identify with the recommended content and view it. As content in these VOD stores is typically present for a set amount of time, curated lists can be properly managed in a timely manner.

However, systems utilizing live television do not have the convenience of a "static" store of content from which to pull recommended items from, or from which to pull media content metadata from. Thus, operators may choose to use "trending" algorithms to highlight those programs that are being heavily viewed, or simply present a complete list of all such live content being provided at a particular point in time from multiple content providers (e.g., display a menu of all currently and/or upcoming content items from multiple "channels" of content) or a list of upcoming content items from a particular provider (e.g., an indicator of a content item that will be on after a currently-airing program).

Accordingly, although VOD curation and automatic recommendation solutions do not have many downfalls, "live" television recommendation systems have many. As mentioned above, live television systems do not have a static store of content, as live television is always changing and new pieces of content can possible begin and end every minute. Additionally, attempting to generate manually-curated lists of recommended items for content that is currently airing is near impossible to maintain, and cannot effectively be customized on a per-user basis.

Further, in systems employing live television the trending algorithms are not very accurate, as trending algorithms can show only what is popular across the entire channel map, and thus does not take into account what types of content the user prefers or normally watches.

Moreover, recommendations of upcoming content (e.g., a "next" TV program) cannot be immediately viewed by users. Thus, feeds that advertise shows that are upcoming do not provide any immediate value to users who wish to view content at that moment.

Accordingly, there remains a strong need for personalized recommendation systems for live television content.

SUMMARY

Systems, methods, apparatuses, and computer-readable media are provided for generating and providing personalized dynamic live content feeds. Embodiments can optimize the viewing experience in systems utilizing live content by taking into account past user-consumption analytics to sort through what content is currently airing and dynamically and intelligently provide recommended content to the user only when such content exists that the user is likely to be interested in. The recommended content can be recommended in dynamic feeds of applicable television shows or movies, for example, and these feeds can be displayed on a user interface only when a minimum number of a specific content items of a particular type or category is currently airing, and can be removed from the user interface when the content finishes airing and/or when the minimum number of items is no longer met.

Accordingly, some embodiments can provide frequently-updated recommendations, which can be personalized to the user and can be made available only when likely-relevant for the user recommendations exist, and can be generated programmatically to avoid the need for manual programming/customization.

According to some embodiments, an exemplary method performed by a dynamic feed generation module executing at a computing device provides personalized dynamic live content feeds. The method includes determining, by the dynamic feed generation module based upon a content playing history of a user, one or more content interests of the user. Each of the one or more content interests identifies a metadata value of a metadata attribute that is common to a plurality of content items within the content playing history of the user. The method further includes determining, by the dynamic feed generation module using a content listing information, that a personalized feed condition for one of the one or more content interests is met. The personalized feed condition is met when at least a threshold number of content items that are live and that are allowed to be played by the user via a client device share a same metadata value with the metadata value identified by the one content interest. The method further includes, responsive to the determining that the personalized feed condition is met, causing a dynamic personalized feed data to be transmitted to the client device of the user to cause the client device to present, to the user, a feed user interface (UI) element for the metadata value identified by the one content interest and one or more feed program UI elements corresponding to one or more of the threshold number of content items. The dynamic personalized feed data includes an identifier of the metadata value and identifiers of each of the one or more of the threshold number of content items.

In some embodiments, the method further includes after causing the dynamic personalized feed data to be transmitted to the client device of the user, determining that the personalized feed condition for the one content interest is no longer met, and causing another dynamic personalized feed data to be transmitted to the client device of the user to cause the client device to no longer present the feed UI element and the one or more feed program UI elements to the user.

In some embodiments, the determining the one or more content interests is based upon one or more entries of the content playing history for previous live television programs viewed at least in part by the user.

In some embodiments, the determining the one or more content interests is based upon one or more entries of the content playing history for previous non-live, on-demand programs viewed at least in part by the user.

In some embodiments, the dynamic personalized feed data further includes one or more identifiers of one or more additional content items that are not currently live but are also associated with the metadata value.

In some embodiments, wherein the content items are live television programs, and in some embodiments, the one or more metadata attributes of the one or more content interests include one or more of a genre, an actor, or a director.

According to some embodiments, an non-transitory computer-readable storage medium has instructions which, when executed by one or more processors of a computing device, cause the computing device to implement a dynamic feed generation module to provide personalized dynamic live content feeds by performing operations. The operations include determining, based upon a content playing history of a user, one or more content interests of the user. Each of the one or more content interests identifies a metadata value of a metadata attribute that is common to a plurality of content items within the content playing history of the user. The operations further include determining, using a content listing information, that a personalized feed condition for one of the one or more content interests is met. The personalized feed condition is met when at least a threshold number of content items that are live and that are allowed to be played by the user via a client device share a same metadata value with the metadata value identified by the one content interest. The operations further include, responsive to the determining that the personalized feed condition is met, causing a dynamic personalized feed data to be transmitted to the client device of the user to cause the client device to present, to the user, a feed user interface (UI) element for the metadata value identified by the one content interest and one or more feed program UI elements corresponding to one or more of the threshold number of content items. The dynamic personalized feed data includes an identifier of the metadata value and identifiers of each of the one or more of the threshold number of content items.

According to some embodiments, an exemplary device includes one or more processors and one or more non-transitory computer-readable storage media having instructions which, when executed by the one or more processors of the device, cause the device to implement a dynamic feed generation module to provide personalized dynamic live content feeds by performing operations. The operations include determining, based upon a content playing history of a user, one or more content interests of the user. Each of the one or more content interests identifies a metadata value of a metadata attribute that is common to a plurality of content items within the content playing history of the user. The operations further include determining, using a content listing information, that a personalized feed condition for one of the one or more content interests is met. The personalized feed condition is met when at least a threshold number of content items that are live and that are allowed to be played by the user via a client device share a same metadata value with the metadata value identified by the one content interest. The operations further include, responsive to the determining that the personalized feed condition is met, causing a dynamic personalized feed data to be transmitted to the client device of the user to cause the client device to present, to the user, a feed user interface (UI) element for the metadata value identified by the one content interest and one or more feed program UI elements corresponding to one or more of the threshold number of content items. The dynamic personalized feed data includes an identifier of the metadata value and identifiers of each of the one or more of the threshold number of content items.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
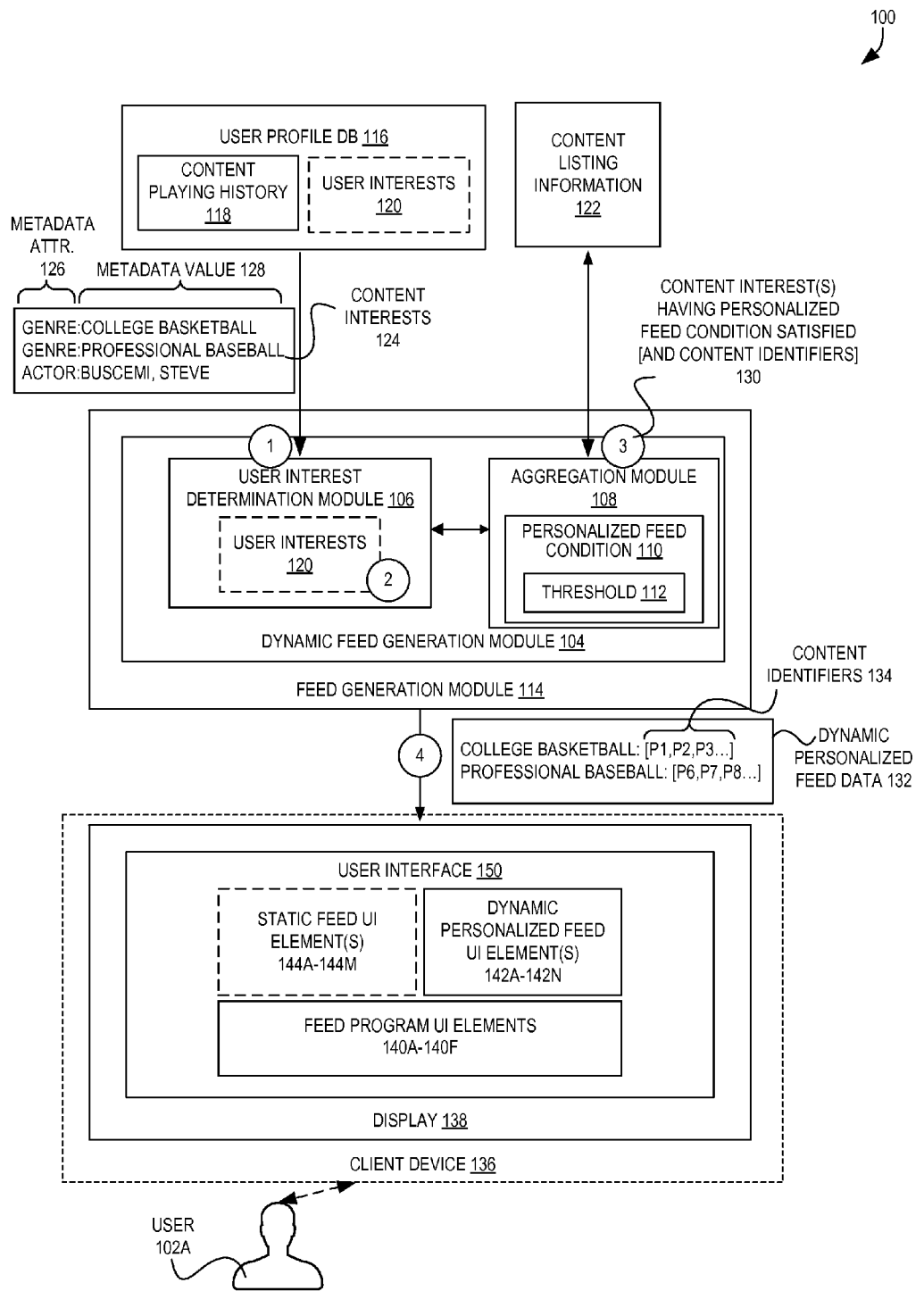
FIG. 1 is a high-level block diagram illustrating components of a system for generating and providing personalized dynamic live content feeds according to some embodiments.

The following description relates to the field of computing systems, and more specifically, describes methods, systems, apparatuses, and computer-readable media for decentralized service placement.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

According to some embodiments, the viewing experience of users within systems providing access to live content can be optimized by taking into account past user-consumption analytics. In some embodiments, recommended live content can be dynamically and intelligently provided to users based upon their prior consumption history so that the recommendations are highly relevant to the user. In some embodiments, live content recommendations will be provided to the user only when such content exists that the user is likely to be interested in, and this content can be recommended in dynamic feeds of applicable television shows or movies, for example. These feeds can be displayed on a user-facing user interface, in some embodiments, only when a minimum number of a specific live content items of a particular type or category are currently airing, and can be removed from the user interface when the content finishes airing and/or the minimum number of items is no longer met.

Accordingly, embodiments can provide frequently-updated recommendations that can be personalized to the user and can be made available only when likely-relevant for the user recommendations exist. Thus, "valuable" user interface space can be freed or made available when personalized content recommendations do not need to be made, and further, needless transmission of "empty" messages can also be avoided in these situations. Additionally, the recommendations for live content can be generated programmatically to avoid the need for manual programming/customization on the part of the system operator, and the recommendations can be certain to be relevant to the user due to the use of that user's prior consumption history in generating live content recommendations.

Further, as "new" feeds of recommended live content items can be provided dynamically, the system remains "fresh" as new feeds of content can come and go somewhat continually. Also, embodiments provide a more personalized system where, for a given user, live content can be presented that is tailored specifically to them, and because no hand curation of aggregated content feeds is required to be performed, there can be a substantial reduction in management time compared to systems using such manually curated lists. Further, as some embodiments can create multiple different (and possibly very specific) live content recommendation feeds, there is no one single feed combining all types of recommendation into one, and thus navigation for the users is improved while more quickly providing visibility into topics of interest to the user.

For further detail, we turn to FIG. 1, which is a high-level block diagram illustrating components of a system 100 for generating and providing personalized dynamic live content feeds according to some embodiments. FIG. 1 includes a user 102A viewing a display 138 that may be part of or connected to an optional client device 136. Via the display 138, the user 102A can interact with a service provided by, for example, a content provider or operator (see, e.g., Content Provider/Operator 706 presented later herein with regard to FIG. 7). This service can include providing access to (e.g., the ability to view, listen to) one or more types of audio and/or visual content.

In some embodiments, at least one type of content provided by the service includes "live content" such as "live" television content, "live" audio or video streams, "live" radio, etc. The term "live" is used to mean that the content is being generally provided where the start time of the content is not controllable by the user. For example, a prerecorded television program being provided by a particular provider from 8:00 PM to 8:30 PM on Tuesday nights (within a particular region of the world) can qualify as "live" even though it was prerecorded. However, a literally "live" broadcast program (e.g., a sporting event, a political event, a concert, a newscast, etc.) provided by a provider (e.g., a television network) can also fall within the usage of the term "live content item" as used herein. Thus, the term live content item is used broadly, and unless otherwise indicated by its context of use, is intended to exclude content (e.g., traditional "video-on-demand" (VOD) content, recorded copies of live content) that is stored and can be played, at its beginning, upon the request of a user.

In some embodiments, the user 102A can be interact with the service through a user interface 150, which can optionally can include one or more static feed UI elements 144A-144M that, when selected, allow a user to view one or more feed program UI elements 140A-140F corresponding to the selected feed (here, a static feed). A static feed can be a representative of a particular category of content that is available to the user, where the definition of the category does not change. For example, as presented later herein with regard to FIG. 3, some examples of static feed UI elements 144A-144M could include an "On Now" feed (represented by static feed UI element 144A) that, when selected, can provide a set of feed program UI elements 306A-306F associated with different live content items available within the system. For example, the set of feed program UI elements 306A-306F could include a feed program UI element for each "channel" available to the user indicating the currently-live content item for that channel. As another example, the set of feed program UI elements 306A-306F could include a feed program UI element for a "Trending" feed (e.g., a list of live content items that are being viewed the most across the service or among a subset of its users, such as those living within a particular geographic area or configured as "friends" or "contacts" of the current user. Yet another example of a feed program UI element could represent an "On Tonight" feed providing a list of live content items that have not yet begun, but will be available at a later time of the day. Note that these feeds are designated as being "static" because they may always be present within a particular user interface.

In contrast, embodiments of the invention include generating and/or providing dynamic personalized feeds, such as through dynamic personalized feed UI elements 142A-142N. These dynamic personalized feed UI elements 142A-142N also, when selected (e.g., clicked on, hovered over), cause a set of one or more feed program UI elements 140A-140F to be presented to the user. However, these dynamic personalized feed UI elements 142A-142N can be dynamically generated, transient (e.g., appear and disappear from the user interface, such as based upon the date, time, satisfaction of a dynamic feed criteria, etc.), and/or user-specific.

The generation of dynamic personalized feeds (represented by the dynamic personalized feed UI elements 142A-142N), in some embodiments, is performed by a dynamic feed generation module 104 of a feed generation module 114. This process can begin, for example, in some embodiments at illustrated circle '1', where the dynamic feed generation module 104 acquires content interest data 124 based upon a user profile database 116 including a content playing history 118 of the user (and possibly of other users as well).

The content interest data 124 can include user-specific metadata including zero, one, or more metadata attributes 126, each corresponding to one or more metadata values 128. In this example, the content interest data 124 includes a metadata attribute 126 of "genre" (corresponding to metadata values 128 "college basketball" and "professional baseball") and "actor" (corresponding to metadata value 128 of "Buscemi, Steve"). Of course, these may be more or fewer metadata attributes/values in different embodiments and/or deployment scenarios.

The content interests 124 indicate, for a particular user, particular "types" of content that the user is determined to have shown an affinity for by having previously consumed (e.g., watched or viewed, listened to) a certain amount of content items of having that type. In this example, the content interests 124 indicate that the particular user has consumed a certain amount of content items with a "genre" of "college basketball" and "professional basketball", and has also consumed a certain amount of content items including the actor "Steve Buscemi."

These content interests 124 can be determined in a variety of ways, which can be customized and selected by the implementing entity according to their own preferences. For example, in some embodiments a metadata attribute-value will be identified for a user when the user has viewed a threshold number of content items over a particular period of time that all have that same attribute-value (e.g., watched more than two, five, ten, etc., "college basketball" games over the last day, week, month, year, etc.). These can be performed by scanning a content playing history 118 of the user as stored/provided by the user profile database 116 to identify commonalities arising across one or more records of previous plays by the user. For example, one or more (or all) of content items that are available in the system and/or were available in the system—live and/or non-live—can have a set of metadata stored indicating different aspects of the particular content item. The metadata can correspond to the metadata attributes 126 and values 128 described herein, and can be for a variety of types of information at a wide variety of levels of abstraction. For example, potential metadata stored for a content item can include one or more of: a name of the content item, a provider/creator of the content item, a content type of the item (e.g., movie, television show), a genre of the item (e.g., action, adventure, drama, comedy, college basketball, sports, country music, documentary), a release/publication date of the item, a length of the item, a director of the item, a writer/producer of the item, an actor or actress involved with the item, keywords associated with the item, a rating of the item, a location depicted within or associated with the item, a season/episode number of the item, etc. Of course, this list is non-exhaustive and illustrative, and many other types of metadata for content items can be used that are recognizable to those of skill in the art.

Accordingly, at circle '1', a set of content interests 124 is identified and provided to the user interest determination module 106. In some embodiments, these content interests 124 can be cached to avoid the need to frequently identify the content interests 124 for the user. Instead, in some embodiments, the identification process may be performed periodically (e.g., every day, every week, every month) to refresh the content interests 124, or performed responsive to an event (e.g., a user logging in/out of the system, a user playing a content item). Thereafter, in some embodiments, these content interests 124 can be cached as user interests 120 by the user interest determination module 106 (see circle '2') and/or within the user profile database 116.

At circle '3', an aggregation module 108 of the dynamic feed generation module 104 can, using the user interests 120 (or content interests 124) along with a content listing information 122 identifying content items (including currently-playing and upcoming live content items), determine whether any personalized feed conditions 110 are satisfied to attempt to "aggregate" multiple live content items together to be part of a dynamic personalized feed.

A personalized feed condition 110 can, in some embodiments, identify a logical condition that is to be met in order for a personalized feed to be generated and provided to a user. In some embodiments, the personalized feed conditions 110 can include one or more threshold amounts 112, which can indicate, for example, a threshold number of live content items that need to be currently playing and that match one of the metadata attribute-values 126/128 of the user's content interests. For example, in some embodiments a personalized feed condition 110 could include a threshold 112 of "five," indicating that at least five currently-playing live content items (as reflected in the content listing information 122) need to have a metadata attribute and/or value (e.g., "Genre: Professional Baseball") matching one of the content interests 124 attribute-values 126/128 of the user in order for a dynamic feed to be generated for the user at this time. In some embodiments, only one personalized feed condition(s) 110 is used for all content interests 124, but in other embodiments more than one personalized feed condition(s) 110 can be used for different types (e.g., different metadata attributes) of content interests. Accordingly, the aggregation module 108 can determine whether there are content interest(s) having a personalized feed condition 110 satisfied that can be used as a dynamic personalized feed, and optionally, determine content item identifiers for the currently-playing or live content items for that feed at circle '3'.

Accordingly, the live content items can be aggregated together in a variety of ways. For example, using these techniques some embodiments can perform genre-based aggregation. For example, if a user views a lot of children's programming, then a new feed can be dynamically created showing children's shows when a minimum number are airing at one time.

As another example, using these techniques some embodiments can perform show type-based aggregation (e.g., based upon a name of a program). For example, if a user views a lot of sporting events (e.g., professional baseball games or college basketball), then a feed can dynamically be created when a minimum number of that specific event is currently airing.

These described operations (at circle '3', perhaps in combination with the operations of circles '1' and/or '2') can occur at a variety of times and responsive to a variety of events. For example, in some embodiments, these operations can occur periodically (e.g., every 30 minutes during certain time periods, every 60 minutes). In some embodiments, one or more of these operations can be performed responsive to certain user-triggered events, such as a user beginning to use the service by turning on a television, opening an "app" provided by a television, mobile device, streaming player, set-top box, etc., the user requesting that a particular user interface be displayed, etc.

As a result, at circle '4' the feed generation module 114 provides dynamic personalized feed data 132 that results from the aggregation process of circle '3' to the client device 136 and/or display 138. This providing can occur after the operations of circle '3', or can similarly occur in response to one or more events (such as those described above) or in response to a request from a client device 136 for this data. In the illustrated embodiment, the dynamic personalized feed data 132 includes those of the user interests 120 (or content interests 124) that satisfied the personalized feed condition(s) 110, along with content identifiers 134 of one or more of those live content identifiers that collectively satisfied the personalized feed condition(s) 110.

For example, if a threshold 112 indicates that five live content items need to be currently playing having appropriate metadata matching the "Genre: Professional Baseball" attribute-value, and if in fact 10 such live content items are found, the personalized feed condition(s) 110 has been satisfied, and the dynamic personalized feed data 132 may include content identifiers 134 of one-to-all of these five live content items. In the illustrated example of FIG. 1, the dynamic personalized feed data 132 includes an identifier of the metadata value 128 "College Basketball" and at least three (and possibly all five) content identifiers 134 "P1, P2, P3 . . . ". Similarly, the dynamic personalized feed data 132 includes an identifier of the metadata value 128 "Professional Baseball" and at least three (and possibly more than three) content identifiers 134 "P6, P7, P8 . . . " of the satisfying live content items. In this example, the dynamic personalized feed data 132 is not illustrated as including the "Actor: Buscemi, Steve" content interest, so it is assumed that the personalized feed condition 110 was not satisfied.

In response, the user interface 150 is then updated in response to include dynamic personalized feed UI elements 142A-142N. For example, one dynamic personalized feed UI element 142 can be created for the first entry of the dynamic personalized feed data 132 (i.e., "College Basketball") and another dynamic personalized feed UI element 142 can be created for the second entry of the dynamic personalized feed data 132 (i.e., "Professional Baseball").

If no such content interests 124 had live content items satisfying the personalized feed condition(s) 110 and thus the dynamic personalized feed data 132 was essentially empty, no dynamic personalized feed UI elements 142 will be displayed—and any previously-existing dynamic personalized feed UI elements 142 may be removed. Thus, the UI 150 becomes a "living" user interface that can frequently update itself with new and interesting content, allowing the user to more easily discover live content items of interest as time passes.

In some embodiments, as described above, when a user 102A selects one of the dynamic personalized feed UI elements 142, one or more feed program UI elements 140A-140F can be presented (on the same UI 150, on a different UI, as an overlay, etc.) that correspond to the content identifiers 134 of the selected feed. For example, each of the feed program UI elements 140A-140F can include a graphical representation (logo, screen capture, still or animated image, etc.) of the content item, a textual description of the content item (e.g., a title, channel name/number, a rating, etc.), and/or other visual elements (e.g., a "progress bar" showing how much of the live content item has elapsed according to its scheduled duration, icons). Upon a selection of one of the feed program UI elements 140A-140F, the user 102A may be provided access to that corresponding live content item, such as by playing a movie, television show, live stream, audio stream, etc.

Thus, embodiments can take past user viewing data into account, find matching/recommended live content items that are airing now, and automatically aggregate and create dynamic feed(s) for the user. Embodiments can give users the live content they will very likely want, right when it's available, aggregated with similar content. In some embodiments, when that content is no longer available, the feed and other aggregated content may advantageously no longer appear in the UI 150, freeing up screen real estate and preventing user confusion from having empty feeds. Beneficially, using features of some of these embodiments, operators no longer need to manually aggregate content and create feeds to present to users.

Figure 2:
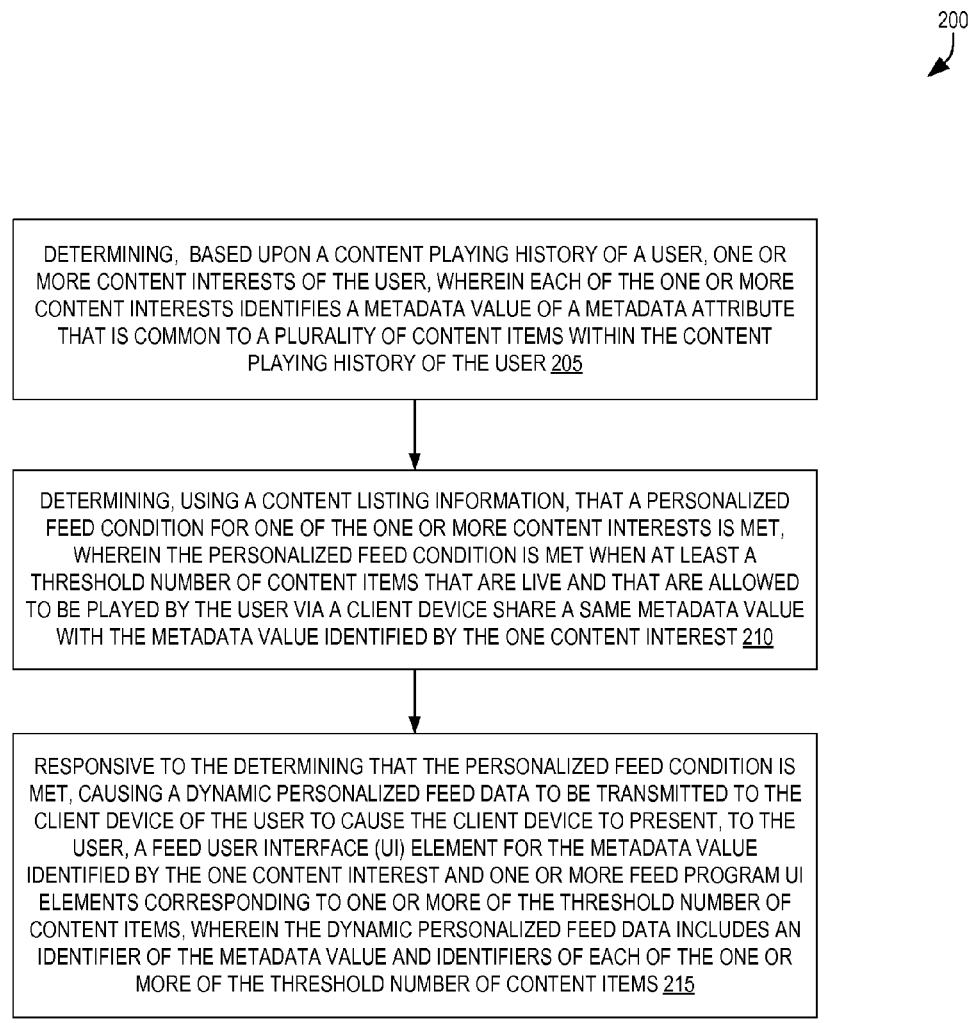
FIG. 2 is a flow diagram illustrating a flow for generating and providing personalized dynamic live content feeds according to some embodiments.

FIG. 2 is a flow diagram illustrating a flow 200 for generating and providing personalized dynamic live content feeds according to some embodiments. The flow 200 can be performed by the dynamic feed generation module 104 of FIG. 1, for example.

In some embodiments, the flow 200 includes block 205 and determining, based upon a content playing history 118 of a user 102A (e.g., from a user profile database 116), one or more content interests 124 of the user. Each of the one or more content interests identifies a metadata value 128 (e.g., "College Basketball") of a metadata attribute 126 (e.g., "Genre") that is common to a plurality of content items within the content playing history of the user.

The flow 200 can also include block 210 and determining, using a content listing information 122 (e.g., a database of current and/or upcoming live content items that can be provided by the system), that a personalized feed condition 110 for one of the one or more content interests is met. The personalized feed condition can be met when at least a threshold number 112 of content items that are live (i.e., are "live" content items) and that are allowed to be played by the user (e.g., per a subscription package providing access to certain channels or streams) via a client device share a same metadata value (e.g., "College Basketball") with the metadata value identified by the one content interest. For example, the threshold amount 112 could require that at least three live content items that are currently available (or soon available—i.e., within another threshold amount of time into the future) be identified from the content listing information 122 that are tagged/associated with a "College Basketball" metadata value (e.g., within its title, within a program type metadata attribute).

The flow 200 can also include block 215, and responsive to the determining that the personalized feed condition is met, causing a dynamic personalized feed data 132 to be transmitted to the client device 136 of the user to cause the client device to present, to the user, a feed user interface (UI) element 142A for the metadata value (e.g., "College Basketball") identified by the one content interest and one or more feed program UI elements 140A-140F corresponding to one or more of the threshold number of content items. The dynamic personalized feed data can include an identifier of the metadata value (e.g., a string of text such as "College Basketball", an alphanumeric identifier that can be used to identify that text, a graphical depiction of that text) and identifiers of each of the one or more of the threshold number of content items.

Accordingly, the user 102A can discover that the feed user interface (UI) element 142A exists, and can be provided with the ability to easily browse/explore the currently-available live content items (via the feed program UI elements 140) that are highly likely to be of interest to the user.

Figure 3:
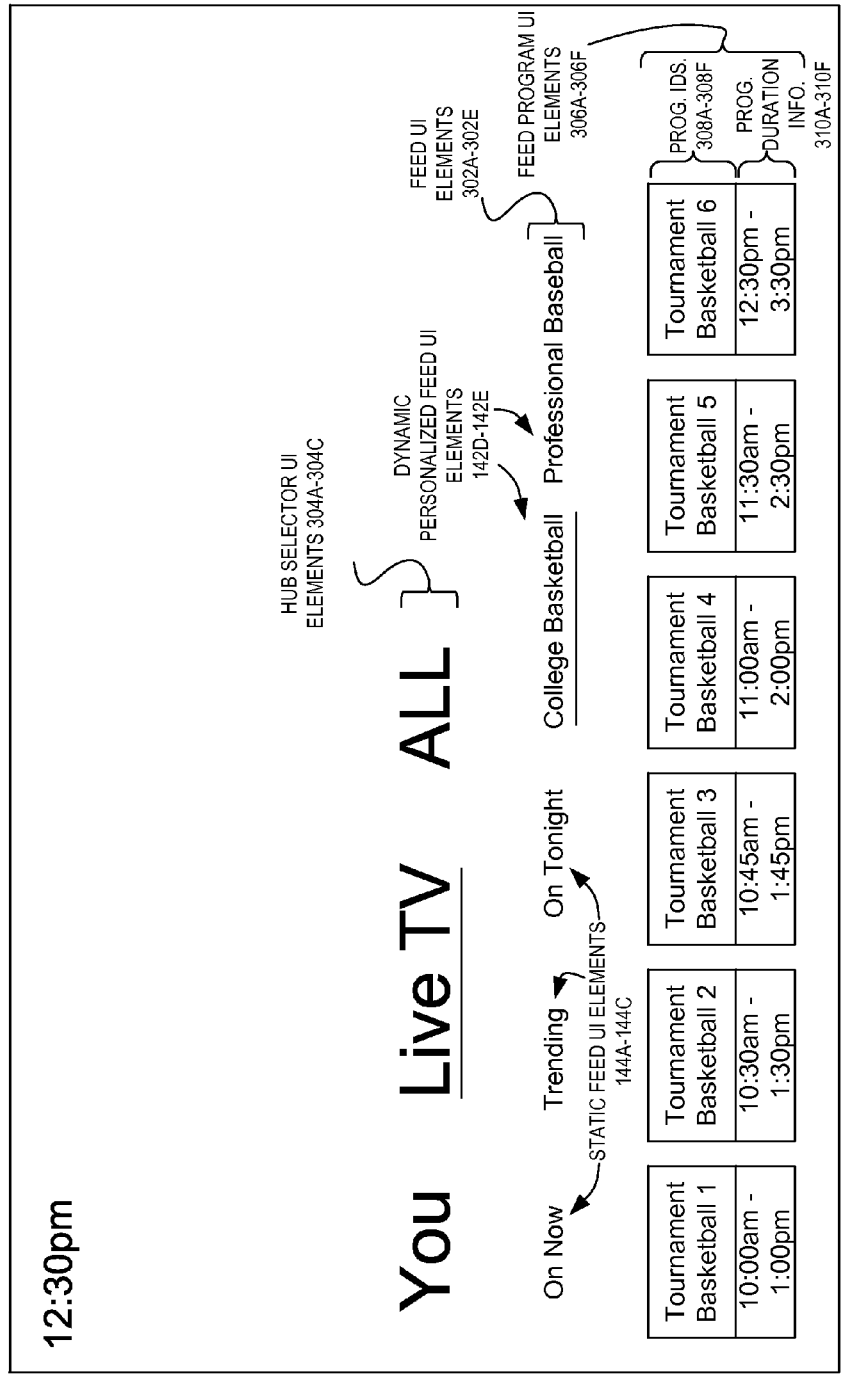
FIG. 3 is a block diagram illustrating an exemplary UI including two dynamic personalized feed UI elements and feed program UI elements of a selected dynamic personalized feed according to some embodiments.

As one simple example, FIG. 3 is a block diagram illustrating an exemplary UI 300 including two dynamic personalized feed UI elements 142D-142E and feed program UI elements 306A-306F of a selected dynamic personalized feed 142D according to some embodiments. For purposes of illustration, additional features of one possible exemplary user interface are illustrated in this figure (and in the other figures); of course, these features certainly need not exist in all embodiments, and are simply provided to illustrate one potential system using features of some embodiments. Thus, these features are to be viewed as illustrative and are not to be viewed as limiting unless these features are explicitly included within the following claims.

The exemplary UI 300 includes an indicator of the current time in the upper-left corner and three hub selector UI elements 304A-304C allowing a user to navigate through various features of the system. In this example, a "Live TV" hub selector UI element 304B is illustrated as being selected using an underline.

Upon the selection of this "Live TV" hub selector UI element 304B, the UI 300 can be updated to include one or more feed UI elements 302A-302E. In this case, the feed UI elements 302A-302E include both static feed UI elements 144A-144C (as described above with regard to FIG. 1) that do not change and dynamic personalized feed UI elements 142D-142E, which can change over time.

The static feed UI elements 144A-144C, in some embodiments, will always be displayed with the "Live TV" hub selector UI element 304B is selected. Thus, they are referred to as "static", and here include "On Now," "Trending," and "On Tonight." In some embodiments, "On Now" can show all live channels with content currently airing, "Trending" can display "popular" shows airing now (e.g., per live viewing data, per historic viewing data), which can be sorted using an algorithm. In some embodiments, "On Tonight" can be an operator-defined and/or manually curated list of content.

The dynamic personalized feed UI elements 142D-142E, being "dynamic," may or may not be displayed when the "Live TV" hub selector UI element 304B is selected. This can be based upon whether or not there are content interests 124 of the current user 102A that have a personalized feed condition 110 that is currently satisfied.

Continuing some of the examples presented in FIG. 1, this figure illustrates a scenario where two of the three content interests 124 illustrated in FIG. 1 have a satisfied personalized feed condition 110—thus, the dynamic personalized feed data 132 can be received by the client device 136 and the UI 300 will include just these two dynamic personalized feed UI elements 142D-142E.

As illustrated, the first dynamic personalized feed UI element 142D is shown as being selected (e.g., by a user action) and thus, the UI 300 is updated to display multiple feed program UI elements 306A-306F to the user for some or all of the live content items identified in the dynamic personalized feed data 132 for that particular dynamic feed. In this case, there are six feed program UI elements 306A-306F that are currently displayed, which can be all (or just a subset of) the entries of the dynamic personalized feed data 132. Each of the six feed program UI elements 306A-306F includes a program identifier 308A-308F (e.g., a title of the particular live content item) and a program duration information 310A-310F indicating beginning and ending times for the particular program. Of course, these two parts of each feed program UI element 306 are illustrative, and in other embodiments there can be more or fewer parts for each element and/or provide different types and combinations of information and data.

In this illustration, each of the live content items (represented by the feed program UI elements 306A-306F) is "currently" being provided as the current time of 12:30 pm is within the time durations of these live content items. Of course, in other embodiments, one or more of the six feed program UI elements 306A-306F may be for a live content item having a time duration including the current time, but may have time durations that are near (e.g., within a threshold difference of time) the current time. For example, one of the six feed program UI elements 306A-306F could be for a live content item that starts in five minutes (e.g., at 12:35 pm).

Thus, the UI 300 indicates that there are six "College Basketball" live content items currently airing on Live TV at 12:30 PM: Tournament Basketball 1: 10:00 AM-1:00 PM; Tournament Basketball 2: 10:30 AM-1:30 PM; Tournament Basketball 3: 10:45 AM-1:45 PM; Tournament Basketball 4: 11:00 AM-2:00 PM; Tournament Basketball 5: 11:30 AM-2:30 PM; and Tournament Basketball 6: 12:30 AM-3:30 PM.

Figure 4:
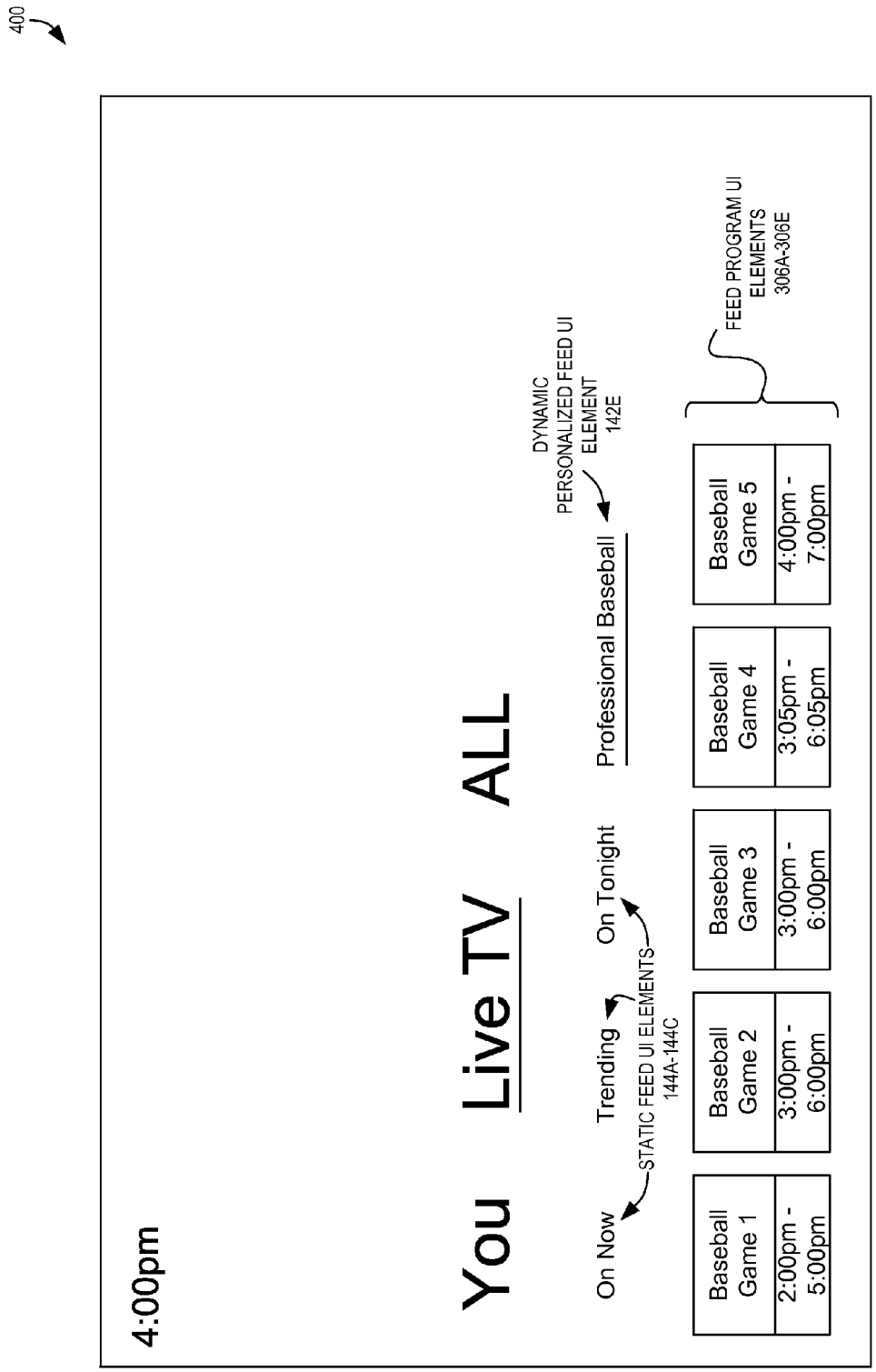
FIG. 4 is a block diagram illustrating an exemplary UI including one dynamic personalized feed UI element and its feed program UI elements according to some embodiments.

As the time changes, the number and types of the dynamic personalized feed UI elements 142 may change. FIG. 4 is a block diagram illustrating an exemplary UI 400 including one dynamic personalized feed UI element 142E and its feed program UI elements 306A-306E according to some embodiments. At 4:00 pm, the basketball games depicted in FIG. 3 will have ended (according to their scheduled durations, at least) and the threshold minimum number of live content items airing on "Live TV" needed to support a feed may no longer be met. Accordingly, the feed will disappear, and thus the dynamic personalized feed UI element 142D for "College Basketball" is eliminated and no longer takes up space in the user interface 300, as illustrated in FIG. 4. Thus, we assume at this point only the "Professional Baseball" content interest has a personalized feed condition 110 that is met.

With the dynamic personalized feed UI element 142E being highlighted, a number of feed program UI elements 306A-306E are shown for baseball games currently airing at 4:00 PM: Baseball Game 1: 2:00 PM-5:00 PM; Baseball Game 2: 3:00 PM-6:00 PM; Baseball Game 3: 3:00 PM-6:00 PM; Baseball Game 4: 3:05 PM-6:05 PM; and Baseball Game 5: 4:00 PM-7:00 PM.

In some embodiments, when these live content items (e.g., baseball games) end, and the minimum number of live content items airing on "Live TV" needed to support a feed is no longer reached, the feed will disappear and thus no longer take up space in the user interface 400. In some embodiments, then, there will be no dynamic personalized feed UI elements 142 displayed.

Figure 5:
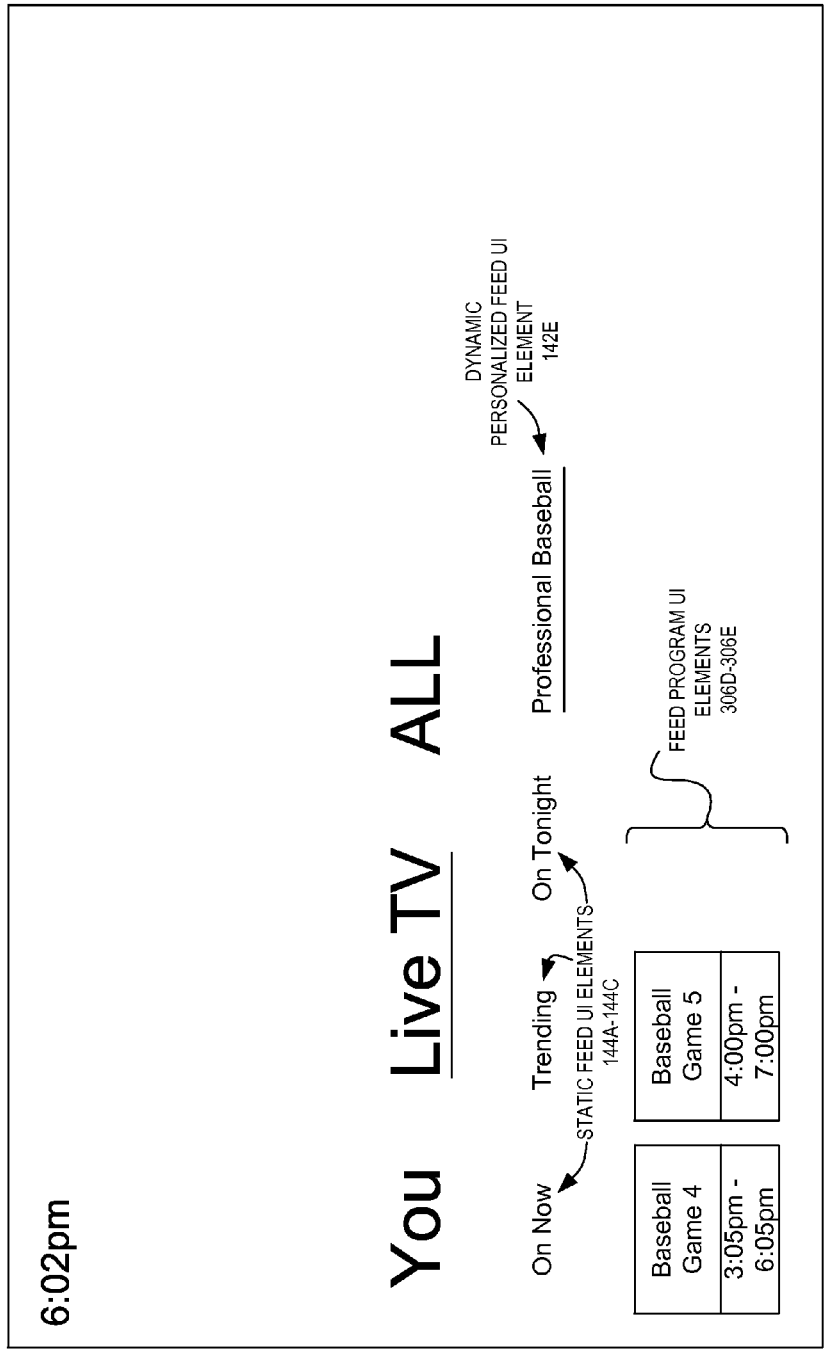
FIG. 5 is a block diagram illustrating an exemplary UI including one dynamic personalized feed UI element that has been preserved despite a threshold condition not being met according to some embodiments.

However, in other embodiments, one or more dynamic personalized feed UI elements 142 may continue to be presented despite these feeds not having the minimum number of live content items airing to support a feed (i.e., the personalized feed condition 110 is not met for the associated metadata value). One such example is presented in FIG. 5, which is a block diagram illustrating an exemplary UI 500 including one dynamic personalized feed UI element 142E that has been "preserved" despite a threshold condition not being met according to some embodiments.

In some embodiments, if a user views some or all of (or is currently viewing) one of the feed program UI elements (e.g., "Baseball Game 2" of FIG. 4) of a dynamic personalized feed UI element 142E (e.g., "Professional Baseball"), the system may be configured to continue presenting the dynamic personalized feed UI element 142E as long as there is at least one live content item for the feed that is still "live."

In this illustrated example, at the current time of 6:02 pm, only two of the original five (see FIG. 4) live content items for the "Professional Baseball" feed are still live. However, based upon a configured factor—such as whether the user has viewed one or more of the live content items from that feed—the dynamic personalized feed UI element 142E may continue to be displayed and the remaining two live content item's feed program UI elements 306D-306E can continue to be presented. This can, for example, allow a user to continue utilizing a personalized dynamic feed that was generated for the user and actually used by the user. Because the user found the live content within the personalized dynamic feed interesting—as expressed based upon watching some of it—the user can be provided with additional live content that is likely of interest, even though there is isn't much of it (comparatively).

Figure 6:
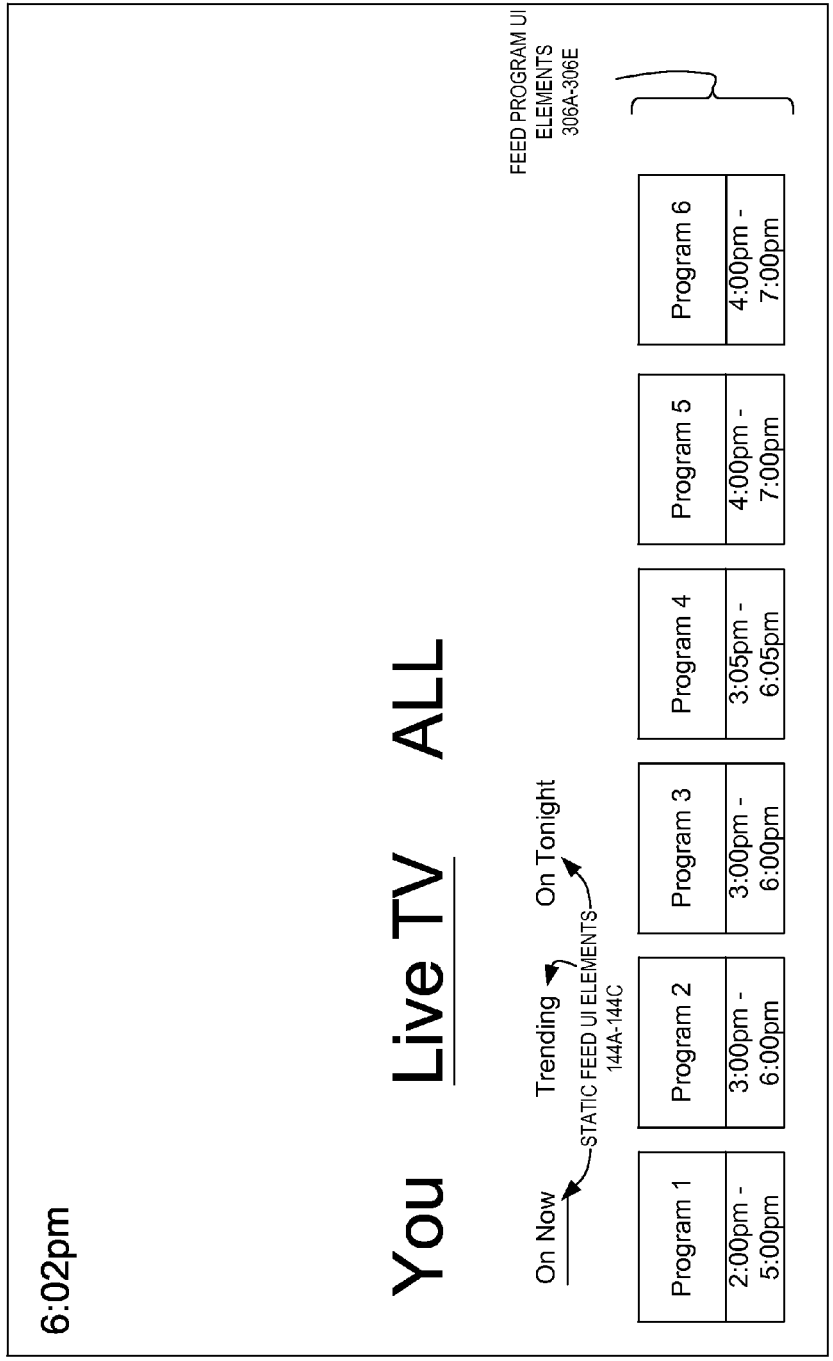
FIG. 6 is a block diagram illustrating an exemplary UI not including any dynamic personalized feed UI element according to some embodiments.

However, as described earlier, if there are not enough live content items to continue supporting any feed (i.e., causing the personalized feed condition 110 to be satisfied for all content interests), the dynamic personalized feed UI elements can be removed. For example, FIG. 6 is a block diagram illustrating an exemplary UI 600 not including any dynamic personalized feed UI element according to some embodiments. Instead, in this case only the static feed UI elements 144A-144C continue to be displayed, and the user can navigate through these feeds to view their associated feed program UI elements 306A-306E.

Accordingly, the disclosed embodiments optimize user interface space, leverage user viewing statistics, and save time for system operators currently need to hand-curate lists of content to present to users. Further, no user action is required to explicitly indicate viewing interest, as embodiments utilize previous viewing history data from the user to deduce content interests. Further, embodiments are not limited to just one "recommendation feed," as multiple dynamic personalized feed UI elements can be presented at once, when warranted.

Various embodiments disclosed herein involve the use of electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

Figure 7:
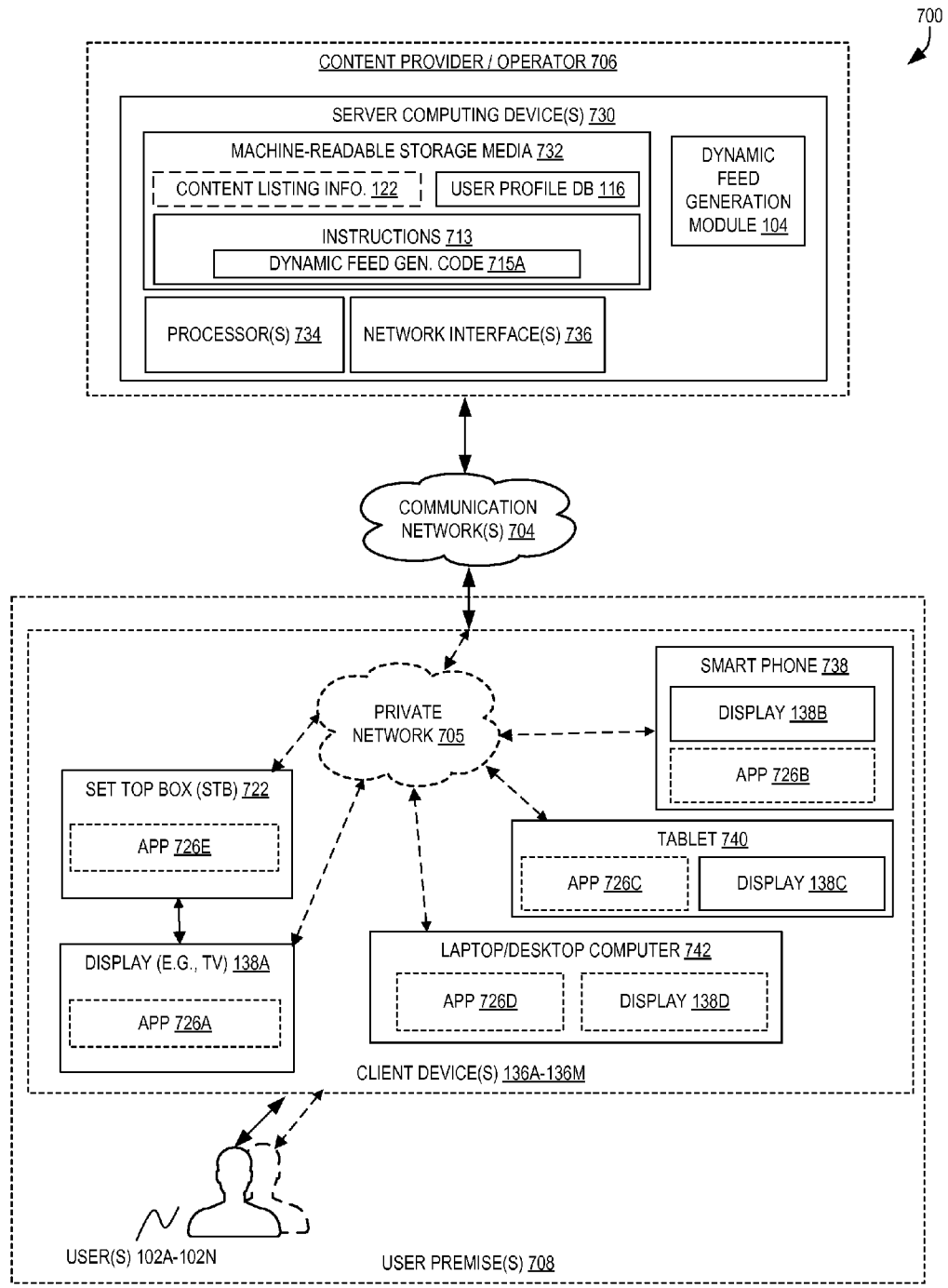
FIG. 7 is a block diagram illustrating a system including an IPTV operator for providing access to media content and generating and providing personalized dynamic live content feeds according to some embodiments.

Some embodiments can be particularly useful for Internet Protocol Television (IPTV) systems. FIG. 7 is a block diagram illustrating a system including an IPTV operator for providing access to media content and generating and providing personalized dynamic live content feeds according to some embodiments.

The system 700 includes one or more content providers and/or system operators 706 that can provide media content to client devices 136A-136M (optionally at one or more user premises 708) via one or more communication networks 704. The communication networks 704 may include any type of data network, voice network, broadcast network, IP-based network, and/or wireless network facilitating communication of data and media content in any format. The communication networks 704 can be implemented using any well-known type of network topology and/or communication protocol, and may be represented or otherwise implemented as a combination of two or more networks. In some embodiments, the communication networks 704 include a public network such as the Internet.

The client devices 136 (or viewing systems, consumer devices, user equipment (UE) devices, etc.) are electronic devices used by users 102A-102N to access media content over the network(s) 704. A non-exhaustive set of client devices 136 are illustrated herein and include a Set Top Box (STB) 722 connected to a display 138A (commonly a television, but can also be another type of monitor, projector, etc.). Other client devices 136 can include a smart phone 738, a tablet 740, and a laptop or desktop computer 742—each of which may include a processor, computer-readable storage, a display 138B-138D, and perhaps a media application 726B-726D that executes to allow connectivity/interaction with the IPTV operator/provider 706. However, other client devices can be implemented as one of, or a combination of, of wired and/or wireless devices, as any form of television client device (e.g., STB 722, DVR), gaming device, computer device, portable computer device, consumer device, media device, communication device, video processing and/or rendering device, appliance device, mobile phone (e.g., cellular, Voice over IP (VoIP), WiFi, etc.), a portable media device (e.g., a personal/portable media player, handheld media player, etc.), and/or as any other type of device that is implemented to receive media content in any form of audio, video, and/or image data. A client device (e.g., STB 722) may also be associated with a user 102A (i.e., a person) and/or an entity that operates the device.

The client devices 136 may be communicatively coupled using a private network 705, which may serve as a Local Area Network (LAN). The private network 705 may include a gateway for connecting the LAN to a Wide Area Network (WAN), which may be network(s) 704. The private network 705 may also include one or more other network nodes, including but not limited to routers, switches, modems, transceivers, cabling, etc. In some embodiments, one or more of the client devices 136 are assigned (or configured to use) "private" non-globally-routable IP address, and in some embodiments these client devices 136 communicate using the network(s) 704 using one or more publicly routable IP addresses.

The various client devices (722, 738, 740, 742) illustrated in system 700 may or may not include a respective display device (e.g., 138A-138D). A client device and display device together render and playback any form of audio, video, and/or image data. A display device (e.g., display 138A) may be implemented as any type of a television, high definition television (HDTV), Liquid Crystal Display (LCD), Light-Emitting Diode (LED) display, or similar display system. The various client devices (e.g., television, gaming, or computer devices) can also be associated with one or more input devices, such as a remote control device for accepting user-selectable input and selections, a gaming controller for user-selectable inputs to the gaming device, and/or a keyboard and/or mouse input devices for user-selectable input to the client device. The client devices described herein can also be implemented with differing combinations of other components such as one or more processors, communication components (e.g., network interfaces), memory components, and/or processing and control circuits. For example, a client device may include network interfaces to receive media content from IPTV operator/provider 706, and interfaces to receive broadcast and/or over-the-air inputs via which media content can be received more traditionally "over the air." The client devices may also include one or more tuners to tune television channels and/or data streams for display and viewing.

The client devices and/or displays may include media applications (or "apps") 726A-726E to assist in providing connectivity to the IPTV operator/provider 706. These media apps 726, when executed by processors of the respective devices, may be configured to cause the respective devices to connect to the IPTV operator/provider 706 (e.g., using a set of network interfaces), send requests to the IPTV operator/provider 706 (e.g., for lists or feeds of media content, for media content itself), receive responses from the IPTV operator/provider 706 (e.g., user interface (UI) elements, media content), present the user interfaces (see, e.g., FIGS. 3-6) on the displays to the users, and/or display the media content and any (optional) corresponding user interfaces (e.g., playback controls, additional media content, advertising, etc.).

In an embodiment, a user (e.g., user 102A) interacts with (e.g., sends commands to) a media application (e.g., media app 726E) while using a user interface presented on a display (e.g., display 138A) by the media app 726E. In some embodiments, the media app 726E interacts with a set of one or more server computing devices 730 to populate elements of the user interface. For example, the media app 726E may issue Application Programming Interface (API) calls (or "API requests") through the network(s) 704 to the server computing devices 730, which then transmit, in response, API responses containing data to the media app 726E.

For example, in some embodiments a feed generation module 114 (including dynamic feed generation module 104) of the server computing devices 730 generates one or more "feeds" of data that are transmitted to the media app 726E, which use data from the feeds to populate UI elements in a user interface presented on the display 138A to the user 102A. Examples of such data "feeds" and their generation by the feed generation module 114 are discussed further throughout this description.

In the depicted embodiment of FIG. 7, the IPTV operator/provider 706 includes one or more server computing devices 730 that include processor(s) 734, network interfaces 736 (for connecting to client devices 136A-136M), and computer-readable storage media 732.

The computer-readable storage media 732, in this depicted embodiment, stores instructions 713 (including dynamic feed generation code 715A) which, when executed by the processor(s) 734 of the server computing device 730, cause the server computing device 730 to implement a dynamic feed generation module 104 to perform operations described herein.

The computer-readable storage media 732, can store copies of media content (e.g., video assets). The term "video asset" is generally used to refer to video or collection of images that may or may not include audio; however, the term "video asset" may also be used generically to refer to a piece of multimedia content, including but not limited to any type of audio, video, and/or image data received from any media content and/or data source. As described herein, a video asset can include recorded video content, video-on-demand (VOD) content, OTT video content, television content (e.g., "live" or delayed television, which may be "broadcast"), advertisements, commercials, music videos, movies, video clips, and other media content. Depending upon configuration, the IPTV operator/provider 706 may provide the media content to the client devices 136 via the network(s) 704, but in some configurations the client devices 136 use the network(s) 704 (or another technique) to directly access media content from other sources.

The computer-readable storage media 732 may also store other media content, metadata, interactive games, network-based applications, and/or any other content or data (e.g., program guide application data (such as content listing info 122), user interface data, advertising content, closed captioning data, content metadata, search results and/or recommendations, etc.) for use by the IPTV operator/provider 706 and/or client devices 136.

The computer-readable storage media 732 may also include a user profile database (DB) 116 as described herein. The user profile database 116, in some embodiments, can include user contact information (e.g., address information, telephone/facsimile number(s), email addresses), financial information (e.g., bank account information, credit card information), payment information (e.g., payment history), and also previous viewing/playing history. For example, in some embodiments, the user profile database 116 includes information identifying one or more actions of the user (e.g., user 102A). The set of user actions may include representations of actions that the user 102A has taken with respect to the IPTV operator/provider 706 and/or media content. These user actions may include one or more interactions that the user has had with a particular item of media content, including viewing details about a video asset through the IPTV operator/provider 706, previewing a video asset, beginning to watch a video asset, stopping watching a video asset before the conclusion of the video asset, watching until the end of the video asset, downloading a video asset, recording a video asset (or the configuration thereof), and/or indicating a preference for a video asset (e.g., "liking" the video asset, "disliking" the video asset, "pinning" the video asset). Of course, other actions may be possibly tracked, and thus other actions in addition to these recited actions may be used in different embodiments.

Figure 8:
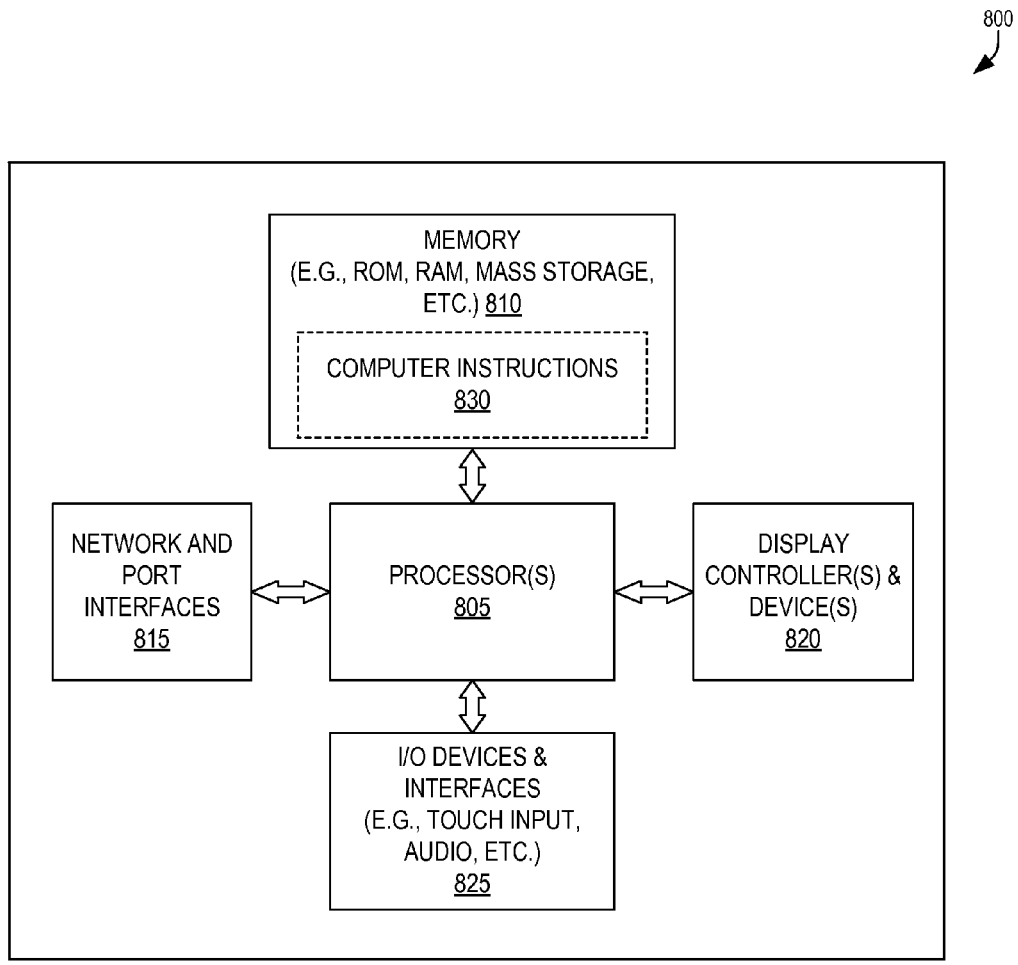
FIG. 8 is a block diagram illustrating an exemplary data processing system that may be used in some embodiments.

For further detail, FIG. 8 is a block diagram illustrating an exemplary data processing system 800 that may be used in some embodiments. Data processing system 800 includes one or more microprocessors 805 and connected system components (e.g., multiple connected chips). Alternatively, the data processing system 800 is a system on a chip. One or more such data processing systems 800 may be utilized to implement the functionality of the modules, server end stations, hosts, or other devices as illustrated above with regard to the other figures.

The data processing system 800 includes memory 810, which is coupled to the microprocessor(s) 805. The memory 810 may be used for storing data, metadata, and programs for execution by the microprocessor(s) 805. For example, the depicted memory 810 may store computer instructions 830 that, when executed by the microprocessor(s) 805, causes the data processing system 800 to perform the operations described herein. The memory 810 may include one or more of volatile and non-volatile memories, such as Random Access Memory ("RAM"), Read Only Memory ("ROM"), a solid state disk ("SSD"), Flash, Phase Change Memory ("PCM"), magnetic storage, or other types of data storage. The memory 810 may be internal or distributed memory. In some embodiments, a portion or all of the computer instructions 830 are stored on an external cloud device.

The data processing system 800 may also include a display controller and display device 820 that provides a visual user interface for the user, e.g., GUI elements or windows. The display device 820 may also display various media content to the user. The data processing system 800 also includes one or more input or output ("I/O") devices and interfaces 825, which are provided to allow a user to provide input to, receive output from, and otherwise transfer data to and from the system. These I/O devices and interfaces 825 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 800. The I/O devices and interfaces 825 may also include a connector for a dock or a connector for a USB interface, FireWire, Thunderbolt, Ethernet, etc., to connect the system 800 with another device, external component, or a network. Exemplary I/O devices and interfaces 825 also include wireless transceivers, such as an Institute of Electrical and Electronics Engineers (IEEE) 802.11 transceiver, an infrared transceiver, a Bluetooth transceiver, a wireless cellular telephony transceiver (e.g., 2G, 3G, 4G, 5G), or another wireless protocol to connect the data processing system 800 with another device, external component, or a network and receive stored instructions, data, tokens, etc. In some embodiments, these various components will be provided as a system on a chip (SoC). It will be appreciated that one or more buses may be used to interconnect the various components shown in FIG. 8.

For example, the data processing system 800 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, a handheld gaming system, a wearable computing device (e.g., smartwatch, digital eyewear), or devices which combine aspects or functions of these devices, such as a media player combined with a PDA and a cellular telephone in one device. In other embodiments, the data processing system 800 may be a network computer, server, network device, router, or an embedded processing device within another device or consumer electronic product. As used herein, the terms computer, system, device, processing device, and "apparatus comprising a processing device" may be used interchangeably with the term data processing system 800 and include the above-listed exemplary embodiments.

It will be appreciated that additional components, not shown, may also be part of the system 800, and, in some embodiments, fewer components than that shown in FIG. 8 may also be used in a data processing system 800. For example, in some embodiments where the data processing system 800 is a router, the router may have one or more control cards configure routing in the network and one or more line cards to switch packets in a network based on the routing configuration from the control cards.

It will be apparent from this description that aspects of embodiments of the invention may be embodied, at least in part, in software. That is, the computer-implemented methods may be carried out in a computer system or other data processing system in response to its processor or processing system executing sequences of instructions contained in a memory, such as memory 810 or other non-transitory machine-readable storage medium. The software may further be transmitted or received over a network (not shown) via a network and/or port interface 815. In various embodiments, hardwired circuitry may be used in combination with the software instructions to implement the present embodiments. Thus, the techniques are not limited to any specific combination of hardware circuitry and software, or to any particular source for the instructions executed by the data processing system 800.

Alternative Embodiments

As described herein, in some embodiments feeds can be customized/personalized specifically to particular users, e.g., based on their past viewing information. However, in some embodiments the entire set of listings of live content items can be searched to identify content items having shared metadata values (similar to the descriptions above with regard to identifying content interests for users), and create feeds when enough similar content is available at a given time. Thus, some embodiments can create and provide dynamic non-personalized live content feeds.

The operations in the flow diagrams have been described with reference to the exemplary embodiments of the other diagrams. However, it should be understood that the operations of the flow diagrams can be performed by embodiments other than those discussed with reference to these other diagrams, and the embodiments discussed with reference these other diagrams can perform operations different than those discussed with reference to the flow diagrams. Similarly, while the flow diagrams in the figures show a particular order of operations performed by some embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, various embodiments are not described with reference to any particular programming language. It will be appreciated that a variety of programming languages may be used to implement the teachings of embodiments of the invention as described herein.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a dynamic feed generation module executing at a computing device for providing personalized dynamic live content feeds, the method comprising:
   determining, by the dynamic feed generation module based upon a content playing history of a user, one or more content interests of the user, wherein each of the one or more content interests identifies a metadata value of a metadata attribute that is common to a plurality of content items within the content playing history of the user;
   determining, by the dynamic feed generation module using a content listing information, that a personalized feed condition for one of the one or more content interests is met, wherein the personalized feed condition is met when at least a threshold number of content items that are live and that are allowed to be played by the user via a client device share a same metadata value with the metadata value identified by the one content interest, wherein the threshold number of content items is greater than one;
   responsive to the determining that the personalized feed condition is met, causing a dynamic personalized feed data to be transmitted to the client device of the user to cause the client device to present, to the user, a feed user interface (UI) element for the metadata value identified by the one content interest and one or more feed program UI elements corresponding to one or more of the threshold number of content items, wherein the dynamic personalized feed data includes an identifier of the metadata value and identifiers of each of the one or more of the threshold number of content items;
   after causing the dynamic personalized feed data to be transmitted, determining that the personalized feed condition for the one content interest is no longer met despite at least one content item existing that is live and is allowed to be played by the user and shares the same metadata value with the metadata value identified by the one content interest; and
   causing another dynamic personalized feed data to be transmitted to the client device to cause the client device to no longer present the feed UI element and the one or more feed program UI elements to the user.

2. The method of claim 1, wherein the determining the one or more content interests is based upon one or more entries of the content playing history for previous live television programs viewed at least in part by the user.

3. The method of claim 1, wherein the determining the one or more content interests is based upon one or more entries of the content playing history for previous non-live, on-demand programs viewed at least in part by the user.

4. The method of claim 1, wherein:
   the dynamic personalized feed data further includes one or more identifiers of one or more additional content items that are not currently live but are also associated with the metadata value.

5. The method of claim 1, wherein the content items are live television programs.

6. The method of claim 1, wherein the one or more metadata attributes of the one or more content interests include one or more of:
   a genre;
   an actor; or
   director.

7. A non-transitory computer-readable storage medium having instructions which, when executed by one or more processors of a computing device, cause the computing device to implement a dynamic feed generation module to provide personalized dynamic live content feeds by performing operations comprising:
   determining, based upon a content playing history of a user, one or more content interests of the user, wherein each of the one or more content interests identifies a metadata value of a metadata attribute that is common to a plurality of content items within the content playing history of the user;
   determining, using a content listing information, that a personalized feed condition for one of the one or more content interests is met, wherein the personalized feed condition is met when at least a threshold number of content items that are live and that are allowed to be played by the user via a client device share a same metadata value with the metadata value identified by the one content interest, wherein the threshold number of content items is greater than one;

responsive to the determining that the personalized feed condition is met, causing a dynamic personalized feed data to be transmitted to the client device of the user to cause the client device to present, to the user, a feed user interface (UI) element for the metadata value identified by the one content interest and one or more feed program UI elements corresponding to one or more of the threshold number of content items, wherein the dynamic personalized feed data includes an identifier of the metadata value and identifiers of each of the one or more of the threshold number of content items;

after causing the dynamic personalized feed data to be transmitted to the client device, determining that the personalized feed condition for the one content interest is no longer met despite at least one content item existing that is live and is allowed to be played by the user and shares the same metadata value with the metadata value identified by the one content interest; and causing another dynamic personalized feed data to be transmitted to the client device to cause the client device to no longer present the feed UI element and the one or more feed program UI elements to the user.

8. The non-transitory computer-readable storage medium of claim 7, wherein the determining the one or more content interests is based upon one or more entries of the content playing history for previous live television programs viewed at least in part by the user.

9. The non-transitory computer-readable storage medium of claim 7, wherein the determining the one or more content interests is based upon one or more entries of the content playing history for previous non-live, on-demand programs viewed at least in part by the user.

10. The non-transitory computer-readable storage medium of claim 7, wherein:
the dynamic personalized feed data further includes one or more identifiers of one or more additional content items that are not currently live but are also associated with the metadata value.

11. The non-transitory computer-readable storage medium of claim 7, wherein the content items are live television programs.

12. The non-transitory computer-readable storage medium of claim 7, wherein the one or more metadata attributes of the one or more content interests include one or more of:
a genre;
an actor; or
a director.

13. A device, comprising:
one or more processors; and
a non-transitory computer-readable storage medium having instructions which, when executed by at least one of the one or more processors, cause the device to implement a dynamic feed generation module to provide personalized dynamic live content feeds by performing operations comprising:

determining, based upon a content playing history of a user, one or more content interests of the user, wherein each of the one or more content interests identifies a metadata value of a metadata attribute that is common to a plurality of content items within the content playing history of the user, determining, using a content listing information, that a personalized feed condition for one of the one or more content interests is met, wherein the personalized feed condition is met when at least a threshold number of content items that are live and that are allowed to be played by the user via a client device share a same metadata value with the metadata value identified by the one content interest, wherein the threshold number of content items is greater than one, responsive to the determining that the personalized feed condition is met, causing a dynamic personalized feed data to be transmitted to the client device of the user to cause the client device to present, to the user, a feed user interface (UI) element for the metadata value identified by the one content interest and one or more feed program UI elements corresponding to one or more of the threshold number of content items, wherein the dynamic personalized feed data includes an identifier of the metadata value and identifiers of each of the one or more of the threshold number of content items, after causing the dynamic personalized feed data to be transmitted to the client device, determining that the personalized feed condition for the one content interest is no longer met despite at least one content item existing that is live and is allowed to be played by the user and shares the same metadata value with the metadata value identified by the one content interest, and causing another dynamic personalized feed data to be transmitted to the client device to cause the client device to no longer present the feed UI element and the one or more feed program UI elements to the user.

14. The device of claim 13, wherein the determining the one or more content interests is based upon one or more entries of the content playing history for previous live television programs viewed at least in part by the user.

15. The device of claim 13, wherein the determining the one or more content interests is based upon one or more entries of the content playing history for previous non-live, on-demand programs viewed at least in part by the user.

16. The device of claim 13, wherein:
the dynamic personalized feed data further includes one or more identifiers of one or more additional content items that are not currently live but are also associated with the metadata value.

17. The device of claim 13, wherein the content items are live television programs.

* * * * *